United States Patent [19]

Caporiccio et al.

[11] 3,976,603

[45] Aug. 24, 1976

[54] FLUORINATED ELASTOMERIC POLYMERS CONTAINING THE 1,3,5-TRIAZINE RING, AND PROCESS FOR PREPARING SAME

[75] Inventors: Gerardo Caporiccio; Gianangelo Bargigia, both of Milan, Italy

[73] Assignee: Montedison S.p.A., Milan, Italy

[22] Filed: Jan. 22, 1975

[21] Appl. No.: 543,161

[30] Foreign Application Priority Data
Jan. 23, 1974   Italy .................................. 19694/74

[52] U.S. Cl. .............................. 260/2 R; 260/2 BP
[51] Int. Cl.² ........................................ C08G 73/08
[58] Field of Search ........................... 260/2 R, 2 BP

[56] References Cited
UNITED STATES PATENTS

| | | | |
|---|---|---|---|
| 3,369,002 | 2/1968 | Griffin | 260/78.4 |
| 3,453,275 | 7/1969 | Grindahl et al. | 260/248 |
| 3,505,411 | 4/1970 | Rice | 260/615 |
| 3,734,976 | 5/1973 | Dorfman et al. | 260/823 |

*Primary Examiner*—Donald E. Czaja
*Assistant Examiner*—E. A. Nielsen

[57] ABSTRACT

New elastomeric polymers containing, in the chains thereof, perfluoropolyether radicals of linear structure and bound by ether bridges to radicals derived from 1,3,5-triazine are disclosed. The new polymers are obtained by polycondensation of certain glycols or alkaline derivatives thereof with 1,3,5-triazines substituted on the ring by at least two halogen atoms.

14 Claims, No Drawings

FLUORINATED ELASTOMERIC POLYMERS CONTAINING THE 1,3,5-TRIAZINE RING, AND PROCESS FOR PREPARING SAME

THE PRIOR ART

The prior art pertaining to elastomeric polymers has not been found to describe the polymers disclosed herein.

THE PRESENT INVENTION

As indicated in the Abstract of Disclosure, the invention provides new elastomeric polymers containing, in the polymer chains, perfluoropolyether radicals having a linear structure and bound by ether bridges to radicals derived from 1,3,5-triazine. Said polymers have several excellent properties in combination, including a high degree of flexibility at low temperatures and good thermal and chemical resistance.

The polymeric chains have the structure of polyethers made up of repeating units of the following formula:

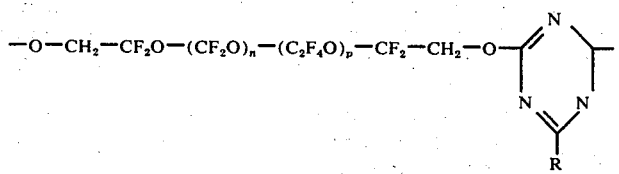

wherein —$C_2F_4$— is a group resulting from opening of the double bond of a tetrafluoroethylene molecule; $CF_2O$— and $C_2F_4O$— are oxyfluoroalkylene units which are simultaneously present and randomly distributed along the chains; indexes n and p are integers from 2 to 100, the sum of $n + p$ being comprised between 5 and 200, preferably between 15 and 100, and the $p/n$ ratio being from 0.2 to 1.5; and R is a hydrogen atom, a halogen atom such as chlorine, bromine or fluorine, an organic hydrocarbon radical, or a primary or secondary amino—which may be halogen—substituted radical. Preferably R is a methyl, ethyl, isopropyl, phenyl, p-tolyl or p-chlorophenyl radical; or an alkoxyl radical such as methoxyl, ethylamino, diethylamino, diphenylamino or anilino.

Some examples of the triazine groups comprised in Formula (I) are:
- -1,3,5- triazinylene ( -2,4-)
- -6-methyl-1,3,5- triazinylene ( -2,4- )
- -6-n-butyl-1,3,5- triazinylene ( -2,4- )
- -6-phenyl-1,3,5- triazinylene ( -2,4- )
- -6-(p-chlorophenyl)-1,3,5- triazinylene ( -2,4- )
- -6-(p-tolyl)-1,3,5- triazinylene ( -2,4- )
- -6-methoxy-1,3,5- triazinylene ( -2,4- )
- -6-isopropoxy-1,3,5- triazinylene ( -2,4- )
- -6-allyloxy-1,3,5- triazinylene ( -2,4- )
- -6-phenoxy-1,3,5- triazinylene ( -2,4- )
- -6anilino-1,3,5- triazinylene ( -2,4- )
- -6diphenylamino-1,3,5- triazinylene ( -2,4- )
- -6-diethylamino-1,3,5- triazinylene ( -2,4- )
- -6-chloro-1,3,5- triazinylene ( -2,4- ) .

With respect to the structure of the polyfluoropolyether blocks which constitute the repeating unit (I), the minimum value of the sum $(n + p)$ of ether units —$C_2F_4O$— and -$CF_2O$—required for obtaining an amorphous polymer is 5.

The polyfluoropolyether block must have a certain length to insure both sufficient spacing of the triazine groups from one another and high rotational freedom of the polyfluoropolyether segment.

By controlling the length of the polyfluoropolyether block, it is possible to prevent the establishing of polar forces or of other secondary interactions of intermolecular type, which generally cause undesirable crystallization phenomena as well as an increase of the second order transition temperature.

By increasing the length of the polyfluoropolyether block, polymers are obtained which exhibit, besides increased flexibility at low temperature, also better thermal and chemical stability. Such improved properties are due to the high rotational freedom as well as to the high chemical stability of the ether bond between the polyfluoropolyether segment and the triazine radical.

On the other hand, a certain number of triazine units must be enchained to the polyfluoropolyether blocks by ether bridges in order to obtain intermolecular cross-linking chains during vulcanization of the elastomeric polymer. This can be achieved by suitably limiting the length of the polyfluoropolyether blocks under the value corresponding to 200 ether units —$C_2F_4O$— and —$CF_2O$—.

From the foregoing considerations, which have led to defining a preferred length of the polyfluoropolyether blocks, it follows that another condition necessary to obtain polymers having the combination of properties characteristic of the present polymers is a low polydispersity index of the functional fluorinated polyether mixtures used as one of the two classes of monomers. The polydispersity index is defined by the $\overline{M}w/\overline{M}n$ ratio, where $\overline{M}w$ is the weight average molecular weight and $\overline{M}n$ is the average numerical molecular weight of the mixture (see P. J. Flory, *Principles Of Polymer Chemistry*, Cornell University Press, New York, 1953, pp. 273 and 292). Preferably, the ratio $\overline{M}w/\overline{M}n$ for the present polymers varies from 1 to 1.3.

The higher the polydispersity index of the mixture, the higher the percentages of polyfluoropolyether segments having the extreme molecular weight values within the molecular weight distribution range stated.

The polymers containing polyfluoropolyether blocks having a low polydispersity index show, on cross-linking thereof, a more regular distribution of the interchain bonds which contributes to improvement in the mechanical characteristics of the polymer.

The polyfluoropolyether blocks constituting the repeating unit of formula (I) are derived from polyfluoropolyether glycols of the following formula:

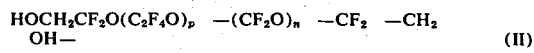

Such glycols are obtained by reduction of polyoxaperfluoroalkandioic acids of formula (III) or of the methyl diesters of said acids:

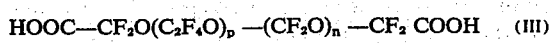

The process for preparing acids (III) is described in U.S. Pat. No. 3,847,978.

The functionality degree of the acids is comprised between 1.4 and 1.999 in relation to a certain content of monofunctional acids with neutral terminal groups of the —$OCF_3$ and —$OCF_2CL$ types.

As is known, the functionality degree influences the D.P (polymerization degree) of the polycondensation polymers and, therefore, in order to obtain polymers having the most desirable molecular weight, it is necessary not only to attain the highest conversions by conducting the polycondensation over long periods of time and at high reaction temperatures, but also to start from monomers having the highest degree of difunctionality.

The reduction of the acids of formula (III) or of the methyl diesters thereof to form glycols of formula (II) can be carried out by means of molecular hydrogen in the presence, as catalysts, of metals of Group VII of the Mendelyeev Periodic System, such as, for example, Pd, Pt or Ru, in the powdered state or supported on fillers such as, for instance, carbon. The reduction can be effected, also, with hydrogen in the presence of copper chromite.

The reduction conditions depend on the type of catalyst used.

Generally, when the catalyst is a metal of Group VII, the reduction is carried out at temperatures of from 20°C to 100°C and pressures of from 1.0 to 100 atms. Using copper chromite, the temperature is from 80°C to 250°C, and the pressure is from 10 to 250 atms.

The reduction can be carried out in the presence of organic liquids such as ethyl ether, methanol, and tetrahydrofuran, or in the absence of such liquids.

The reduction can also be carried out with complex hydrides of Al and of B, such as, for instance, $LiAlH_4$ and $NaBH_4$, according to known methods. (M. Stacey, J. C. Tatlow, H. Peacock, "Advances In Fluorine Chemistry," Vol. 6, p. 69, Butterworths, London, 1970).

The elastomeric polymers of this invention are obtained by polycondensation, in the presence of solvents and at temperatures of from about 120°C to about 250°C, of the glycols of formula (II) or the alkaline salts of such glycols, with 1,3,5-triazines substituted on the ring by at least two halogen atoms, e.g., chlorine, bromine, fluorine.

Examples of useful halogen-substituted triazines are:
2,4-dichloro-1,3,5-triazine
2,4-dichloro-6-methyl-1,3,5-triazine
2,4-dichloro-6-n-butyl-1,3,5-triazine
2,4-dichloro-6-phenyl-1,3,5-triazine
2,4-dibromo-6-phenyl-1,3,5-triazine
2,4-difluoro-6-phenyl-1,3,5-triazine
2,4-dichloro-6-(p-chlorophenyl)-1,3,5-triazine
2,4-dichloro-6-(p-tolyl)-1,3,5-triazine
2,4-dichloro-6-methoxy-1,3,5-triazine
2,4-dichloro-6-isopropoxy-1,3,5-triazine
2,4-dichloro-6-allyloxy-1,3,5-triazine
2,4-dichloro-6-phenoxy-1,3,5-triazine
2,4-dichloro-6-anilino-1,3,5-triazine
2,4-dichloro-6-diphenylamino-1,3,5-triazine
2,4-dichloro-6-diethylamino-1,3,5-triazine
2,4,6-trichloro-1,3,5-triazine.

Polycondensation is conducted in the presence of pure solvents or of mixtures of solvents. Some examples of suitable reaction solvent systems are: ethyl ether, tetrahydrofuran, dioxane, benzene, toluene, xylene, sulpholane, 1,1,2-trichlorotrifluoroethane or mixtures thereof.

When the glycols of Formula (II) are introduced into the polymerization reaction in the form of alkaline alcoholates, alkaline halides are liberated during the reaction. In this case, the reaction is conducted at a temperature comprised between 20° and 100°C, preferably at a temperature lower than 50°C.

The polycondensation can be conducted, also, by reacting free glycols with the triazine halogen compounds. In such case, the polymerization temperature is generally high, usually comprised between 100° and 250°C, and the reaction is conducted in high-boiling solvents such as, for example, phenylether, dichlorobenzene, ditolylmethane, decalin. During the reaction, gaseous haloid acid is liberated, and optionally, can be reacted with a basic material such as, for example, pyridine, sodium carbonate, calcium carbonate, potassium fluorine, introduced into the reaction zone.

To obtain polymers of high molecular weights, the ratio between the monomeric unit derived from glycol (II) and the monomeric unit of triazine structure must be unitary.

However, it may be suitable to employ a ratio between the monomers favourable to a moderate excess of triazine unit in order to obtain polymeric chains predominantly ending with a halogen triazine, on which it is subsequently possible to start an end-capping process preferably by means of alkaline alcoholates or phenates. A polymer exhibiting the best properties of resistance to high temperatures is thus obtained.

The cross-linking of the polyether can be accomplished through the action of organic peroxides, when triazine radicals substituted by alkyl or phenyl groups are present. Examples of suitable peroxide compounds are: dicumyl peroxide, diterbutyl peroxide, and diisopropyl peroxide, used at temperatures comprised between 100° and 180°C.

The elastomeric polymers can be cross-linked, also, by arranging on the polymer chains units having reactive groups which can be substituted by particular difunctional reagents. For instance, by carrying out the polycondensation of the fluorinated glycol (II) with a mixture of alkyl- or phenyl- substituted 2,4-dichlorotriazine and of 2,4,6-trichlorotriazine, and by maintaining an equimolar ratio between the glycol and the sum of the triazine units, due to the relative inertia of one of the three chlorine atoms of 2,4,6-trichlorotriazine, under the polymerization conditions, it is possible to obtain a linear polymer having a desired chlorine content.

This permits substitution of the chlorine atoms by reaction with difunctional organic compounds having a nucleophile action in a step successive to the polymerization and under severer conditions. For this purpose substances such as 2,2-bis (4-hydroxyphenyl)-propane, 2,2-bis (4-hydroxy-phenyl) perfluoropropane, 4,4-dihydroxydiphenyl sulphone, are suitable. Glycols of formula (II) having a molecular weight ranging from 178 to 5000, preferably from 244 to 1000, may be used as well.

The following examples are given to illustrate the invention and are not intended to be limiting.

EXAMPLE 1

A 2 l. Pyrex glass flask, provided with stirrer, reflux condenser, dropping funnel, inlet and outlet tubes for inert gas, was fed, in a nitrogen atmosphere, with 10 g of LiAlH$_4$ dissolved in 800 cc of anhydrous ethyl ether. After having brought the ethyl ether to bland boiling, 100 g of a mixture of perfluoropolyether methyl diesters, corresponding to the structure of Formula (III) and consisting of components having a molecular weight comprised between 700 and 1500 and an average molecular weight of 1100, are introduced into the flask in three hours. The ether was kept continuously boiling during the reaction.

On completion of the diester addition, the reaction was carried on, always under stirring and boiling, for a further 3 hours. LiAlH$_4$ in excess was eliminated by means of an ethyl acetate ether solution and 300 ml of a HCl 6 N aqueous solution were finally added. The glycol-containing ether layer was dried with Na$_2$SO$_4$ and freed of the solvent by distillation.

87 g Of fluorinated glycol were obtained, having a structure corresponding to Formula (II), the $p/n$ ratio being 1, and the average molecular weight being equal to 1040, as determined by titration of the acetic acid freed due to acetylation of glycol with acetic anhydride (J. Dandoy, A. Alloing-Bernard and Renson-Denenbourg, *Ind. Chim. Belg.* 36, 689—93, 1971).

5.2 g Of CH$_3$ONa dissolved in 15 ml of methanol were introduced into a 500 ml Pyrex glass flask, provided with stirrer, dropping funnel, inlet and outlet tubes for nitrogen, and containing 50 g of the aforesaid fluorinated glycol.

The dropping funnel was replaced by a capillary tube for introducing dry nitrogen into the solution, and a Liebig cooler, connected with a flask for the distillate collection, as connected with the flask; distillation was conducted at reduced pressure, under a slight nitrogen bubbling, and methanol was thoroughly removed avoiding heating the mixture to a temperature higher than 30°C.

Sodium glycolate was dispersed in 140 ml of dry 1,1,2-trichlorotrifluoroethane and 10.86 g of 2,4-dichloro-6-phenyl-1,3,5-triazine, dissolved in 60 ml of tetrahydrofuran, were added in 30 minutes. 10 ml of sulpholane were subsequently added. Stirring was conducted for 3 hours at 20°C and for 5 hours under solvent reflux. After addition of water, the lower layer consisting of a solvent-impregnated raw polymer separated.

After removal of the solvent, the product was transferred to a conical-bottomed flask and, while keeping a slight nitrogen flow, it was heated for 3 hours at 200°C, for 3 hours at 240°C and for 3 hours at 280°C at an absolute pressure decreasing from 200 mm to 0.1 mm Hg. During this treatment, polymeric products having a low molecular weight distilled and the remaining residue consisted of 46 g of a pasty polyether. The value of the inherent viscosity, measured in a 5% polyether solution in the 1,1,2-trichloro-trifluoroethane mixture at 20°C, was 0.45 (dl/g).

A polymer sample subjected to thermogravimetric analysis in a Du Pont 900 thermoanalyzer exhibited a thermal decomposition threshold in air, (conventionally defined by a 2% weight loss) at a temperature of 351°C, while on the differential thermal analysis the polymer proved to be completely amorphous and exhibited a glass transition temperature of −96°C. A sample of the fluorinated polyether (100 parts), mixed with carbon black of the MT-type (20 parts) and with ditert.-butyl-peroxydiisopropylbenzene charged with 60% of CaCO$_3$(20 parts), was vulcanized by keeping it for 60 minutes between the plates of a Carver press under a 5000 kg load, at a temperature of 160°C and for 2 hours at the same temperature in an oven under vacuum.

On specimens of the material so vulcanized, cut out according to standards ASTM D 412-41 and subjected to tensile strength on a dynamometer, type Amsler O. 2 ZH 118, a tensile stress of 85 kg/cm$^2$, an elongation at break of 350% and a 300% modulus of 50 kg/cm$^2$ were measured.

EXAMPLE 2

5.0 g of the glycol described in Example 1, 1.08 g of 2,4-dichloro-6-phenyl-1,3,5-triazine, 1.02 of sodium carbonate in form of a fine powder and 25 cc of decalin were introduced into a 50 cc flask provided with stirrer, reflux cooler, inlet and outlet tubes for inert gas. After intense stirring for 1 hour at 20°C, the whole was brought to 150°C and kept at such temperature for 20 hours.

After cooling, the reaction mixture was poured into water and the inorganic salts were extracted with three successive 25 cc-portions of water. The mixture of polymer and decalin was evaporated under vacuum to remove the solvent, then heated according to the temperature schedule of Example 1. Small amounts of polymers having a low molecular weight distilled and the residue consisted of an elastic product, soluble in a 1,1,2-trichlorotrifluoroethane - methanol mixture ( 8 : 2vol. ). The inherent viscosity measured in a 0.5% solution of the polymer, in the above-indicated solvents mixture, was 0.35 (dl/g).

EXAMPLE 3

This Example describes the preparation of a copolymer containing also the unit deriving from 2,4,6-trichloro-1,3,5-triazine and prepared from a fluorinated polyether glycol having a molecular weight of 2200, obtained from the reduction of a mixture of methyl diesters, having a molecular weight comprised between 1500 and 2700 and an average molecular weight of 2280, according to the method described in Example 1.

42.3 g of glycol, 3.92 g of 2,4-dichloro-6-phenyl-1,3,5-triazine, 0.354 g of 2,4,6-trichloro-triazine and 80 cc of diphenylether were introduced into a 250 ml flask, provided with reflux cooler, stirrer, inlet and outlet tubes for inert gas and thermometer well. Under stirring and in an inert atmosphere, the mixture was heated to 220°C until almost thorough evolution of HCl, which required about 8 hours.

After cooling to a temperature of 20°C, the upper solvent layer was drawn off and the last traces of high boiling solvent were removed by extraction with two portions of ethyl ether under reflux.

The remaining residue consisted of a paste-like polymeric product exhibiting an inherent viscosity, measured as in Example 1, of 0.35 (dl/g). A polymer sample subjected to thermogravimetric analysis exhibited a thermal decomposition threshold in air at a temperature of 355°C, while the thermodifferential analysis revealed that the product was amorphous and had a glass transition temperature of −115°C.

A sample of the described polyether polymer (100 parts), mixed with carbon black type MT (25 parts), with the potassium salt of 2,2-bis (4-hydroxyphenyl) perfluoropropane (1 part) and with Ca(OH)$_2$ (5 parts), was vulcanized by keeping it for 60 minutes between the plates of a Carver press at 180°C and at the same temperature for 60 minutes in an oven under vacuum. From the vulcanized product specimens were cut out which, subjected to tensile stress, exhibited a tensile strength of 50 kg/cm$^2$, a elongation at break of 450% and a 300% modulus of 37 kg/cm$^2$.

On other specimens, a hardness (I.R.H.D.) of 45 degrees and a compression set of 30% after compression at 100°C for 40 hours were determined. Samples of the elastomer charged and vulcanized as described exhibited, after a 7-day dipping in solvents at 25°C, the following swelling (Δ V/V%) values:

| | | |
|---|---|---|
| in benzene | = | + 2% |
| in n-hexane | = | + 0.5% |
| in 1,1,2-trichlorotrifluoroethane | = | + 3% |
| in methanol | = | + 1% |
| in methanol | = | + 1% |
| in Fomblim oil type YO | = | − 1% |
| in acetone | = | + 1.5% |
| in H$_2$SO$_4$ | = | 96% − 0.2%. |

A second sample of the raw polymer (100 parts) was charged with carbon black type MT (25 parts) and with the sodium salt of a fluorinated glycol (2 parts) having a molecular weight of 460 (1 part). It was vulcanized by keeping it between the plates of a Carver press at 120°C for 60 minutes and, at the same temperature, in an oven under vacuum for a further 60 minutes. From the vulcanized product, specimens were cut out which, subjected to tensile stress, exhibited a tensile strength of 40 kg/cm$^2$, an elongation at break of 600% and a 300% modulus of 30 kg/cm$^2$.

EXAMPLE 4

22 g Of fluorinated glycol having a molecular weight of 1040, as described in Example 1, in 70 ml of tetrahydrofuran, were introduced into a 250 ml glass flask, provided with stirrer, dropping funnel, nitrogen inlet and outlet tubes and containing a suspension of 1.0 g of sodium hydride in 10 ml of n-hexane; the whole was kept under stirring for 4 hours until complete reaction. 4.70 g of 2,4-dichloro-6-phenyl-1,3,5-triazine dissolved in 20 ml of tetrahydrofuran, followed by 5 ml of sulpholan were then introduced into the flask. After maintaining the mass for 6 hours at 30°C, it was mixed with 0.074 g of sodium phenate in 10 ml of tetrahydrofuran under stirring which was continued for a further 3 hours. Water was then added and the lower layer, consisting of solvent-impregnated raw polymer, was drawn off. The polymer was dried and heated as described in Example 1.

In a 0.5% polymer solution in the 1,1,2-trichloro-trifluoroethane mixture at 20°C the inherent viscosity value was of 0.38 dl/g. The thermogravimetric analysis of a polyether sample revealed a thermal decomposition threshold in air at a temperature of 364°C.

What we claim is:
1. Fluorinated elastomeric polymers the perfluoropolyether macromolecular chain of which is made up of a repeating unit

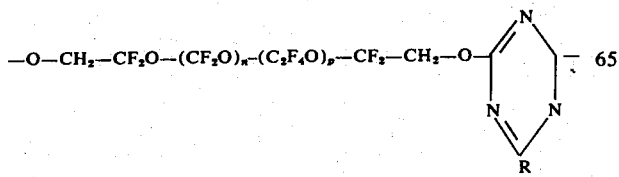

wherein —C$_2$F$_4$— is a group resulting from opening of the double bond of a tetrafluoroethylene molecule, —C$_2$F$_4$O— and —CF$_2$O— are oxyperfluoroalkylene units randomly distributed along the chain, indexes $n$ and $p$ are integers from 2 to 100, the sum ($n+p$) is an integer from 5 to 200, the $p/n$ ratio is comprised between 0.2 and 1.5, R is hydrogen, halogen, a hydrocarbon organic non-substituted radical, a halogen-substituted hydrocarbon radical, a primary or secondary amino radical or an alkoxy radical.

2. Fluorinated elastomeric polymers according to claim 1, in which the sum ($n + p$) is an integer from 15 to 100.

3. Elastomeric polymers according to claim 1, in which the halogen is chlorine, bromine or fluorine.

4. Elastomeric polymers according to claim 1, in which the polydispersity index defined by the ratio $\overline{Mw}/\overline{Mn}$, where $\overline{Mw}$ is the average weight molecular weight and $\overline{Mn}$ is the average number molecular weight of the polyfluoropolyether segment, is low and is from 1 to 1.3.

5. Elastomeric polymers according to claim 1, vulcanized with an organic peroxide at temperatures of from 100° to 180°C.

6. Elastomeric polymers according to claim 1, in which the triazine ring contains chlorine or fluorine atoms and the polymer is vulcanized by reaction of said atoms with difunctional organic compounds having a nucleophilic action.

7. A process for preparing the elastomeric polymers according to claim 1, by polycondensation, and characterized in that glycols of the formula

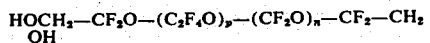

in which $n$ and $p$ are integers from 2 to 100, the sum ($n + p$) is an integer from 5 to 200, and the ratio $p/n$ is from 0.2 to 1.5, or alkaline salts of said glycols, are reacted with 1,3,5-triazine substituted on the ring by at least two halogen atoms, in the presence of solvents and at temperatures from about 20°C to about 250°C.

8. The process of claim 7, in which two or three halogen atoms are present on the triazine ring and are chlorine, bromine or fluorine atoms.

9. The process of claim 5, in which the alkaline alcoholates of the glycols are reacted with the triazine compounds in a solvent which is an aromatic hydrocarbon, a low-boiling ether, tetrahydrofuran, dioxane, sulpholan or 1,1,2-trichlorotrifluoroethane, or mixtures thereof, at temperatures of from 20° to 100°C.

10. The process of claim 5, in which the free glycols and the triazine glycols are reacted at temperatures comprised between 100° and 250°C in a high boiling solvent which is phenylether, a dihalogenated aromatic hydrocarbon, ditolylmethane or decalin, and haloid ether is freed in the gaseous state.

11. The process of claim 5, in which the haloid ether formed is neutralized with a basic substance.

12. The process of claim 5, in which the polycondensation product is crosslinked with an organic peroxide.

13. The process of claim 5, in which the glycol, or alkaline alcoholate of the glycol, is polycondensed with a trihalogen-substituted triazine and the product is crosslinked with a disfunctional organic compound having a nucleophile action.

14. The polymers of claim 1, vulcanized and in the form of manufactured shaped articles.

* * * * *

UNITED STATES PATENT OFFICE
CERTIFICATE OF CORRECTION

Patent No. 3,976,603  Dated August 24, 1976

Inventor(s) Gerardo CAPORICCIO et al

It is certified that error appears in the above-identified patent and that said Letters Patent are hereby corrected as shown below:

Col. 1 line 59, "-6anilino-1,3,5-triazinylene (-2,4-)" should be - - - -6-anilino-1 3,5-triazinylene (-2,4-) - - -.

Col. 1, line 60, -6diphenylamino-1,3,5-triazinylene (-2,4-) should be - - - -6-diphenylamino-1,3,5-triazinylene (-2,4-) - - -.

Col. 3, line 22, "Group VII" should be - - - Group VIII - - -.

Col. 3, line 30, "Group VII" should be - - - Group VIII - - -.

Col. 4, line 62, "4,4" should be - - - 4,4' - - -.

Col. 5, line 37, before "connected" the word "as " should be - - - was - - -.

UNITED STATES PATENT OFFICE
CERTIFICATE OF CORRECTION

Patent No. 3,976,603   Dated August 24, 1976

Inventor(s) Gerardo CAPORICCIO et al

It is certified that error appears in the above-identified patent and that said Letters Patent are hereby corrected as shown below:

Col. 7, line 8,  "a" before "elongation" should be --- an ---.

Col. 7, line 15, "($\Delta$V/V%)" should be --- $\frac{(\Delta V\%)}{V}$ ---.

Signed and Sealed this

Seventh Day of March 1978

[SEAL]

Attest:

RUTH C. MASON
Attesting Officer

LUTRELLE F. PARKER
Acting Commissioner of Patents and Trademarks